United States Patent [19]
Resnikoff et al.

[11] Patent Number: 5,583,952
[45] Date of Patent: Dec. 10, 1996

[54] METHOD AND APPARATUS FOR REPRESENTING AN IMAGE BY ITERATIVELY SYNTHESIZING HIGH AND LOW FREQUENCY COMPONENTS

[75] Inventors: Howard L. Resnikoff, Winchester; William Zettler, Jr., Brookline, both of Mass.

[73] Assignee: Aware, Inc., Bedford, Mass.

[21] Appl. No.: 2,113

[22] Filed: Jan. 4, 1993

Related U.S. Application Data

[60] Continuation of Ser. No. 722,857, Jun. 28, 1991, abandoned, which is a division of Ser. No. 477,564, Feb. 9, 1990, Pat. No. 5,068,911.

[51] Int. Cl.$^6$ ..................................................... G06K 9/40
[52] U.S. Cl. ................... 382/233; 382/240; 358/426; 358/430; 364/724.06; 364/724.08
[58] Field of Search ............................ 382/56, 233, 240, 382/260; 358/426, 432, 433; 381/31, 45, 49; 364/724.06, 724.08, 724.09, 724.1, 715.02; H04N 1/41

[56] References Cited

U.S. PATENT DOCUMENTS

| | | | |
|---|---|---|---|
| 4,777,620 | 10/1988 | Shimoni et al. | 364/900 |
| 4,817,182 | 3/1989 | Adelson et al. | 382/56 |
| 5,014,134 | 5/1991 | Lawton et al. | 358/261.3 |

*Primary Examiner*—Leo Boudreau
*Assistant Examiner*—Andrew W. Johns
*Attorney, Agent, or Firm*—Calvin Ward

[57] ABSTRACT

An apparatus for decompressing an image that has been compressed by an image compression system in which the image is first repetitively filtered in one direction to produce a series of sub-images which are then repetitively filtered in a second direction to produce an image representation having a plurality of sub-images in which each sub-image has a different spatial frequency content is disclosed. The decompression apparatus reverses the filtering process to recover the original image.

3 Claims, 4 Drawing Sheets

METHOD AND APPARATUS FOR REPRESENTING AN IMAGE BY ITERATIVELY SYNTHESIZING HIGH AND LOW FREQUENCY COMPONENTS

This application is a continuation of application Ser. No. 07/722,857 filed Jun. 28, 1991, now abandoned, which was a division of application Ser. No. 07/477,564 filed Feb. 9, 1990, now U.S. Pat. No. 5,068,911.

BACKGROUND OF THE INVENTION

The present invention relates to methods and apparatuses for transforming an array of data and, more specifically, to a method and apparatus for reducing the amount of data needed to store an image.

Images are conventionally represented by a two-dimensional array of values in which each value represents a property of the image at a corresponding point on the image. In the case of black and white images, a single number representing the gradations of intensity from white to black, referred to as the gray scale, is stored. In the case of color images, each "value" is a vector whose components represent the gradations in intensity of the various primary colors at the corresponding point in the image.

This representation of an image corresponds to the output of a typical image sensing device such as a television camera. Such a representation is convenient in that it is easily regenerated on a display device such as a CRT tube. However, it has at least two short-comings. First, the number of bits needed to represent the data is prohibitively large for many applications. Second, if the image is to be processed to extract features which are ordered in the same order of importance as that perceived by a person viewing the image, the amount of processing needed can be prohibitively large.

The number of bits needed to store a typical image is sufficiently large to limit the use of images in data processing and communication systems. A single 512×512 gray scale image with 256 gray levels requires in excess of 256,000 bytes. A small scale computer user is limited to disk storage systems having a capacity of typically 300 Mbytes. Hence, less than 1200 images can be stored without utilizing some form of image compression.

Similarly, the transmission of images over conventional telephone circuitry is limited by the high number of bits needed to represent the image. An 8×11 inch image digitized to 256 gray levels at 200 dots per inch (the resolution utilized in typical FAX transmissions) requires in excess of 28 million bits. Normal consumer quality analog telephone lines are limited to a digital communication rate of 9600 bits per second. Hence, the transmission of the image requires in excess of 45 minutes in the absence of some form of image compression.

The need to reduce the data required to represent an image has led to numerous image compression methods. These methods can be conveniently divided into two classes, invertible and non-invertible methods. The invertible methods reduce redundancy but do not destroy any of the information present in the image. These methods transform the two-dimensional array into a form requiring fewer bits to store. The original two-dimensional array is generated by the inverse transformation prior to display. The regenerated image is identical to the original image.

Consider a black and white image which has been digitized to two gray levels, black and white. The image consists of a two-dimensional array of bits. A one-dimensional list of bits can be generated from the two-dimensional array by copying, in order, each row of the two-dimensional array into the one-dimensional array. It has been observed that the one-dimensional array has long runs of ones or zeros. Consider a run of 100 ones. One hundred bits are required to represent the run in the one-dimensional array. However, the same 100 bits could be represented by a 7-bit counter value specifying the length of the run and the value "zero" specifying the repeated gray level. Hence, the 100 bits can be reduced to 8-bits. This is the basis of a transformation of the one-dimensional array in which the transformed image consisting of a sequence of paired values, each pair consisting of a count and a bit value.

One can define a compression ratio which is the ratio of the number of bits in the original two-dimensional array to the number of bits needed to store the transformed image. For typical black/white images, compression ratios of the order of 5 to 10 can be obtained utilizing these methods. However, the gains obtained decrease rapidly as the number of gray levels is increased. At higher numbers of gray levels, the probability of finding repeated runs of the same gray level decreases. Each time the gray level changes, a new pair of values must be entered into the file. As a result, compression ratios exceeding 3 are seldom obtained for invertible compression of gray level images.

Higher compression ratios can be obtained if non-invertible compression methods are utilized. In such methods, the image regenerated by the inverse transformation is not identical to the original image.

Conventional error measures are of only limited value in comparing two non-invertible compression methods. For example, consider two transformations. The first transformation results in random noise being introduced into the regenerated image. That is, each pixel in the regenerated image differs from that in the original image by an amount which is randomly distributed between two values. The second transformation results in a constant having a value equal to the difference in these two values being added to each pixel in a narrow band across the image. The second transformation introduces an error having a root mean squared error which is significantly less than that introduced by the first transformation. However, the regenerated image produced by the first transformation is far more acceptable than that produced by the second transformation.

The typical prior art non-invertible image compression transformations can be divided into two steps. In the first step, two sets of coefficients, $p_i$ and $q_j$, are derived from the image by fitting the image to a linear expansion of the form $$I(x,y) = \sum_i p_i f_i(x,y) + \sum_j q_j g_j(x,y)$$

As will be explained in more detail below, the basis functions $f_i$ and $g_j$ are chosen such that the most "important" information contained in the image is represented by the p's and the least important information is represented by the q's. The transformation in question is invertible in the sense that given an N×N set of pixels, $I(x_i,y_j)$, one can determine a total of $N^2$ coefficients $p_i$ and $q_i$ that will exactly reproduce the $N^2$ values $I(x_i,y_j)$. Since there are $N^2$ pixels and $N^2$ coefficients, the set of coefficients requires the same number of bits to store as the image if the transform coefficients are stored to the same precision as the image pixel intensities. Hence, the transformation alone does not produce any compression of the image.

In the second step of the image compression transformation, the coefficients $p_i$ and $q_j$ are quantized. The number of bits used to represent each $p_i$ is greater than that used to represent each $q_j$, since the $p_i$ represent the most important information in the image. Thus oen will be able to recover the $p_i$'s more accurately than the $q_i$'s. If each $p_i$ is represented by the same number of bits as the image pixels, a net reduction in the number of bits needed to represent the image is achieved. However, the reduced precision utilized in the representation of the $q_i$ are the source of the non-invertiblity of the transformation.

For the above discussed technique to be useful, the image transformation must separate the information into coefficients having the property that a sub-set of the coefficients contains the important image information. It is known that the most subjectively important image information is contained in the low spatial frequency components of the image. Hence, the functions $f_i(x,y)$ must be limited in their spatial frequency response to lower frequencies than the functions $g_j(x,y)$. If this condition is satisfied, then the coefficients $p_i$ will represent more important information than the coefficients $q_j$.

In addition to the low spatial frequency information, specific images may have information in high frequency components which is also important. Edges typically contribute to the high spatial frequency data. An image with a large number of edges oriented in a specific direction will therefore have a significant high frequency component if one or more of the $g_j$ functions represents edges having the orientation in question. Hence, it would be advantageous to be able to divide the $g_j$ into classes such that one or more of the classes can be quantized with increased accuracy when the coefficients associated with the sub-class indicate that a significant amount of information is contained in the class.

In addition, basis functions which reflect the structures found in typical images are more likely to require fewer functions to represent an image with a given degree of fidelity. It is known that images tend to include structures which vary in intensity smoothly over the structure. Hence, sets of basis functions in which the $f_i$ can approximate low order polynomials would be advantageous. If the basis functions are orthonormal, this is equivalent to requiring that at least the first two moments of each of the basis functions $g_j$ vanish.

To better understand the cause of the errors and the manner in which the transformation in the first step of the compression affects the type of errors, the manner in which the quantization is performed will now be discussed in more detail. To simplify the discussion, it will be assumed that only the $p_i$ coefficients are quantized to more than zero bits. That is, zero bits will be allocated for each of the $q_i$. It will be assumed that the image is to be compressed by a factor R. The number of bits available for representing each coefficient $p_i$ will be denoted by K. Let $P_{min}$ and $P_{max}$ be the minimum and maximum values, respectively, of the set of parameters $\{p_i\}$. In the simplest case, $2^K$ equally spaced levels, $L_j$, are defined between $P_{min}$ and $P_{max}$. Each coefficient $p_i$ is then replaced by an integer, k, where $L_k \leq p_i < L_{k+1}$. These integers, or a suitably coded version of them, are stored in place of the coefficients, $p_i$.

An approximation to the image, I'(x,y) can be reconstructed from the compressed representation, where $$I'(x,y) = \sum_i p'_i f_i(x,y)$$

where, for purposes of illustration, $p'_i=(L_k+L_{k+1})/2$. Here, k is the integer stored in place of $p_i$.

From the above discussion, it will be apparent that an error of as much as half of the level spacing may be introduced by this quantization procedure. The above example set the levels with reference to $P_{min}$ and $P_{max}$ to simplify the discussion. Other methods for placing the $2^K$ levels so as to minimize the overall error resulting from the quantization process are known in the art. In general, these methods utilize the variance of the set of values $\{p_i\}$ and the statistical distribution of the values to set the levels. In this case, the larger the variance, the larger the quantization error. In general, the variance is determined by the image being quantized and the invertible transformation used to calculate the parameters.

Hence, it is advantageous to provide an invertible transformation which minimizes the variance of the coefficients to be quantized. For a given image, it can be shown that the variance of the sets of coefficients $\{p_i\}$ and $\{q_j\}$ will be reduced if the basis functions $f_i(x,y)$ and $g_j(x,y)$ form an orthonormal basis for the two-dimensional image space.

The above described properties of the image transformation allow one to reduce the errors introduced at the quantization stage. However, there will always be errors. The manner in which these errors influence the reconstructed image will depend on the basis functions $f_i(x,y)$ and $g_j(x,y)$. It is useful to distinguish the various classes of basis functions by the fraction of the image over which each of the basis functions is non-zero. This will be referred to as the support of the basis function.

If the basis functions have support which is of the same order of size as the image itself, then a quantization error in one coefficient will affect the entire reconstructed image. This leads to aliasing errors in the reconstructed images. Such errors are subjectively very objectionable. For example, a quantization error in a single coefficient could lead to "stripes" extending across the entire reconstructed image.

If, on the other hand, the basis function have support which is small, then such a quantization error will only affect a small area of the reconstructed image. This leads to errors which are more like random noise. As noted above, random noise errors can be incurred without producing a subjectively objectionable image.

Although a number of transformations have been utilized in the prior art, none have provided all of the above advantageous features. For example, one class of transformations is based on the Fourier expansion for the image transformation. The Fourier series basis functions have the advantage of providing an orthonormal basis for the image space. However, these functions have a number of disadvantages. First, the support of every Fourier basis function is the entire image; hence, quantization errors tend to produce aliasing errors which are subjectively unsatisfactory. Second, the computational work load to compute the Fourier transform is of order nlog(n), where n is the number of pixels in the original image. To overcome this difficulty, the image is often divided into smaller sub-images which are pieced together after reconstruction. This procedure reduces the computational work load, but leads to other artifacts in the reconstructed image.

A second prior art solution to the image transformation problem is taught in U.S. Pat. No. 4,817,182 by Adelson, et al. In the method taught by Adelson, et al., the image is processed by a quadrature mirror filter (QMF) to produce four filtered images which are, in reality, four sets of coefficients. Three of the sets of coefficients are analogous to the $q_j$ discussed above in that they represent high spatial frequency information. The fourth set of coefficients is analogous to the $p_i$ in that these coefficients represent low frequency information. The number of coefficients in each set is the same. Adelson, et al. teach treating the low frequency components as an image of one quarter the size and then reprocessing the low frequency coefficients using the same QMF. This iterative procedure leads to a pyramid of coefficient sets with a low frequency set at the top and three sets of high frequency coefficients at each level below the top. Each level represents information having higher frequency than the level above it.

It may be shown that this method is equivalent to the transformation discussed above with the $q_j$ being further divided into different sets. Although Adelson, et al. refer to their QMF method as being equivalent to expanding the image in an orthonormal basis set, this method does not provide the claimed orthonormal expansion. The basis functions corresponding to a QMF are symmetric by definition. Using this property of the QMF basis functions, it can be shown that the QMF basis functions can not be an orthonormal set. Hence, this method does not provide an optimal transformation of the image.

Another problem with the method taught by Adelson, et al. is that no means for selecting the QMF filter in terms of the image properties is taught. As a result, the basis functions taught therein do not optimally represent smoothly varying image features.

Broadly, it is an object of the present invention to provide an improved apparatus and method for coding an image such that the coded image can be represented in fewer bits than the encoded image.

It is a further object of the present invention to provide an apparatus and method which utilize an orthonormal transformation of the image.

It is yet another object of the present invention to provide an apparatus and method in which the transformation utilizes basis functions having compact support.

It is yet another object of the present invention to provide an apparatus and method in which the transformation utilizes basis functions that can adequately represent smoothly varying images.

It is a still further object of the present invention to provide an apparatus and method in which the transformation allows the high frequency basis functions to be divided into a greater number of sub-classes than the prior art image compression transformations.

These and other objects of the present invention will become apparent to those skilled in the art from the following detailed description of the invention and the accompanying drawings.

SUMMARY OF THE INVENTION

The present invention comprises an apparatus and method for generating a representation of an input array comprising a two-dimensional array of numbers. The array of numbers is organized as a plurality of linear arrays corresponding to the rows and columns of the two-dimensional array. The apparatus includes storage for at least one row of said input array. The apparatus utilizes a filter for filtering a linear array of numbers to generate high and low frequency linear arrays of numbers, said high and low frequency linear arrays representing the high and low frequency components of said input linear array. The apparatus utilizes row processing circuitry for causing said filter to process each said row in said input array to generate a low frequency row array representing said input array. The low frequency row array includes a two-dimensional array of numbers organized as a plurality of rows and columns. The row processing means iteratively processes a row of said input array. In the first pass of said iteration said filter filters the row. In successive steps of the iteration process, the filter is caused to filter the low frequency array generated in the previous iteration. The row processing means further comprises circuitry for storing the low frequency array generated in the last said iteration in said low frequency row array at a row location corresponding to the location of the row in said input array from which said low frequency array was generated. The data in the low frequency row array is processed by a column processing circuit which causes said filter to process each column in the low frequency row array to generate a low frequency column array representing said input array. The low frequency column array comprises a two-dimensional array of numbers organized as a plurality of rows and columns. The column processing circuit comprises circuitry for iteratively processing a column of said low frequency row array. In the first pass of said iteration, said filter is caused to filter said column and, in said successive passes, said filter is caused to filter the low frequency array generated in the previous iteration. The column processing means further comprises means for storing the low frequency array generated in the last said iteration in said low frequency column array at a column location corresponding to the location of the column in said low frequency row array from which said low frequency array was generated.

DETAILED DESCRIPTION OF THE INVENTION

The present invention may be more easily understood with reference to a prior art sub-band image coding scheme such as that taught by Adelson, et al. in U.S. Pat. No. 4,817,182. Adelson, et al. teach a method for transforming an image represented by an array of numbers $I_{i,j}$ into four sub-arrays which, for reasons that will be become apparent from the following discussion, will be referred to as $LL_{i,j}$, $LH_{i,j}$, $HL_{i,j}$, and $HH_{i,j}$. Each of the sub-arrays has one quarter the number of elements as the original array $I_{i,j}$.

Figure 1:
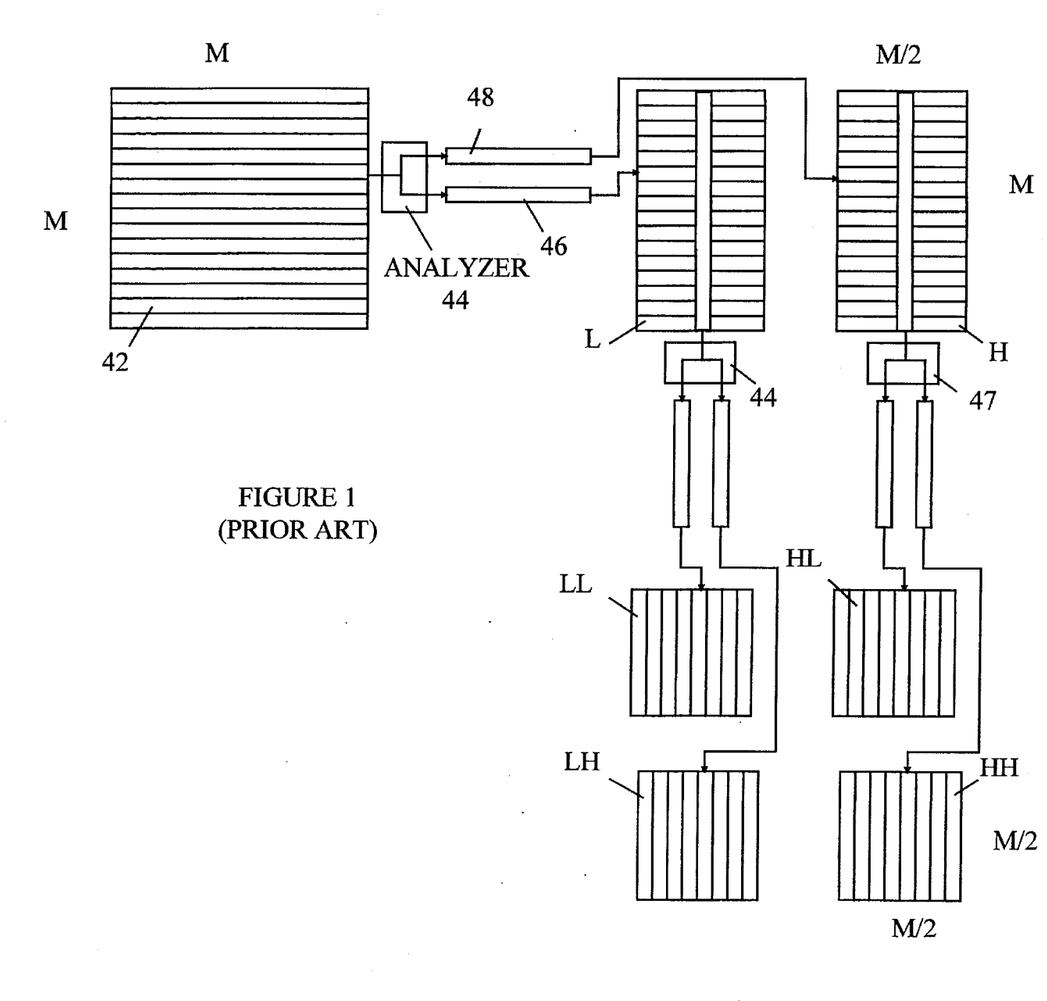
FIG. 1 illustrates a prior art apparatus for compressing an image.

Referring to FIG. 1 which is a block diagram of a typical prior art apparatus for converting an M×M element array 42 into four sub-arrays labeled LL, HL, LH, and HH, respectively, the transformation is accomplished in two steps. In the first step, each row of the original array 42 is processed by an analyzer 44 to produce two linear arrays of coefficients 46 and 48. Each array of coefficients has M/2 elements. The arrays of coefficients are stored in two (M/2)×M arrays labeled L and H. Each of the (M/2)×M sub-arrays is then processed in a similar manner by applying an analyzer 44 to each column of the sub-array to produce two sets of coefficients. For example, each column in the L array is processed to produce two M/2 arrays which are then stored as columns of the arrays LL and LH. Similarly, each column of the H array is processed to produce two sub-arrays having M/2 elements which are stored in the HL and HH arrays.

The analyzer components used in this decomposition are convolution circuits which treat each linear array input thereto as a signal which is to be divided into low and high frequency components.

If the elements of the input array are denoted by x(i), the analyzers generate two arrays $Y_L(m)$ and $Y_H(m)$ according to the formulas $$y_L(m) = \sum_{k=0}^{N-1} a(k)x(2m - N + k) \quad (1)$$

$$y_H(m) = \sum_{k=0}^{N-1} a(k)(-1)^{k+1} x(2m + 1 - k)$$

Here, m runs from 0 to (M/2)−1. The vector $y_L$ obtained by so transforming the $i^{th}$ row of image 42 becomes the $i^{th}$ row of image L as shown in FIG. 1. Similarly, the vector $y_H$ obtained from the $i^{th}$ row becomes the $i^{th}$ row of image H.

The above described transformation requires that some value be assigned to pixels that lie outside the original image, i.e., x(i) for i<0 or i>M−1. For simplicity it will be assumed that each linear array is cyclic, i.e., x(i)=x(i+M). In this case, it can be shown that $y_L$ and $y_H$ each have at most M/2 non-zero components.

Provided the elements a(k) satisfy certain conditions which will be described in more detail below, the $Y_L$ can be shown to represent the low frequency component of the data $x_i$ and $Y_H$ will represent the high frequency component of the data.

The decomposition described above can be reversed to regenerate the original data x(i) provided the a(k) satisfy the constraints described below. In this case, two M/2 component vectors are combined by a another convolution operation to produce a linear array z(m) according to the formulas:

$$z(2m) = \sum_{k=0}^{(N/2)-1} a(2k)x_L[m-k+(N/2)] + \quad (2)$$

$$\sum_{k=0}^{(N/2)-1} a(2k+1)x_H(m+k)$$

$$z(2m+1) = \sum_{k=0}^{(N/2)-1} a(2k+1)x_L[m+(N/2)-k] -$$

$$\sum_{k=0}^{(N/2)-1} a(2k)x_H(m+k).$$

As noted above, the a(k) must satisfy certain conditions. These conditions will now be discussed. The first set of conditions are needed to guarantee that the transformation by which a single vector x is split into components, $x_L$ and $x_H$, is invertible. That is, if a vector x is input to an analyzer which outputs vectors, $x_L$ and $x_H$, then the output of a synthesizer which has as its inputs $x_L$ and $x_H$ will be x. These conditions can be written as follows:

$$\sum_{i=0}^{N-1} a^2(i) = 2 \quad (3)$$

Here, a(k)=0 for k<0 or k>(N−1). N must be an even number.

Although the condition specified in Eq. (3) guarantees invertiblity, it does not guarantee that $y_L$ and $y_H$ generated by the transformation detailed in Eq. (1) will be the low and high frequency components of x. For this to be true, the a(k) must also satisfy the condition:

$$\sum_{i=0}^{N-1} a(i) = 2 \quad (4)$$

If these conditions are met, then the $y_L$ and $y_H$ generated by Eq. (1) will correspond to the low and high frequency representations of x and, further, applying $y_L$ and $y_H$ to a synthesizer will regenerate the original array x.

If the a(i), viewed as a function of i, are symmetric about some i value, it can be shown that one avoids phase distortion of the "signal" x(i) as it passes through the filter. Such convolution filters are referred to as Quadrature Mirror Filters (QMF) in the electronic arts.

If the a(i) satisfy the condition $$\sum_{i=0}^{N-1} a(i)a(i+k) = 0 \quad (5)$$

for even k>0, then the filter is referred to as a Conjugate Quadrature Filter (CQF). Since it can be shown that no finite symmetric sequence of a(i) can satisfy Eq. (5), QMF and CQF filters represent two distinct non-overlapping classes of finite impulse response filters. Prior art image decomposition schemes such as that taught by Adelson, et al. utilize QMF filters. As will be explained in more detail below, CQF filters provide significantly better image decomposition.

Referring again to FIG. 1, the LL array can be shown to contain the information pertaining to the low spatial frequency components of the image. In principle, one could achieve image compression at this point of up to 4:1 by quantizing the LL array to a higher accuracy then the HH, LH, and HL arrays. Four to one image compression would be obtained by ignoring these last three arrays altogether.

Figure 2:
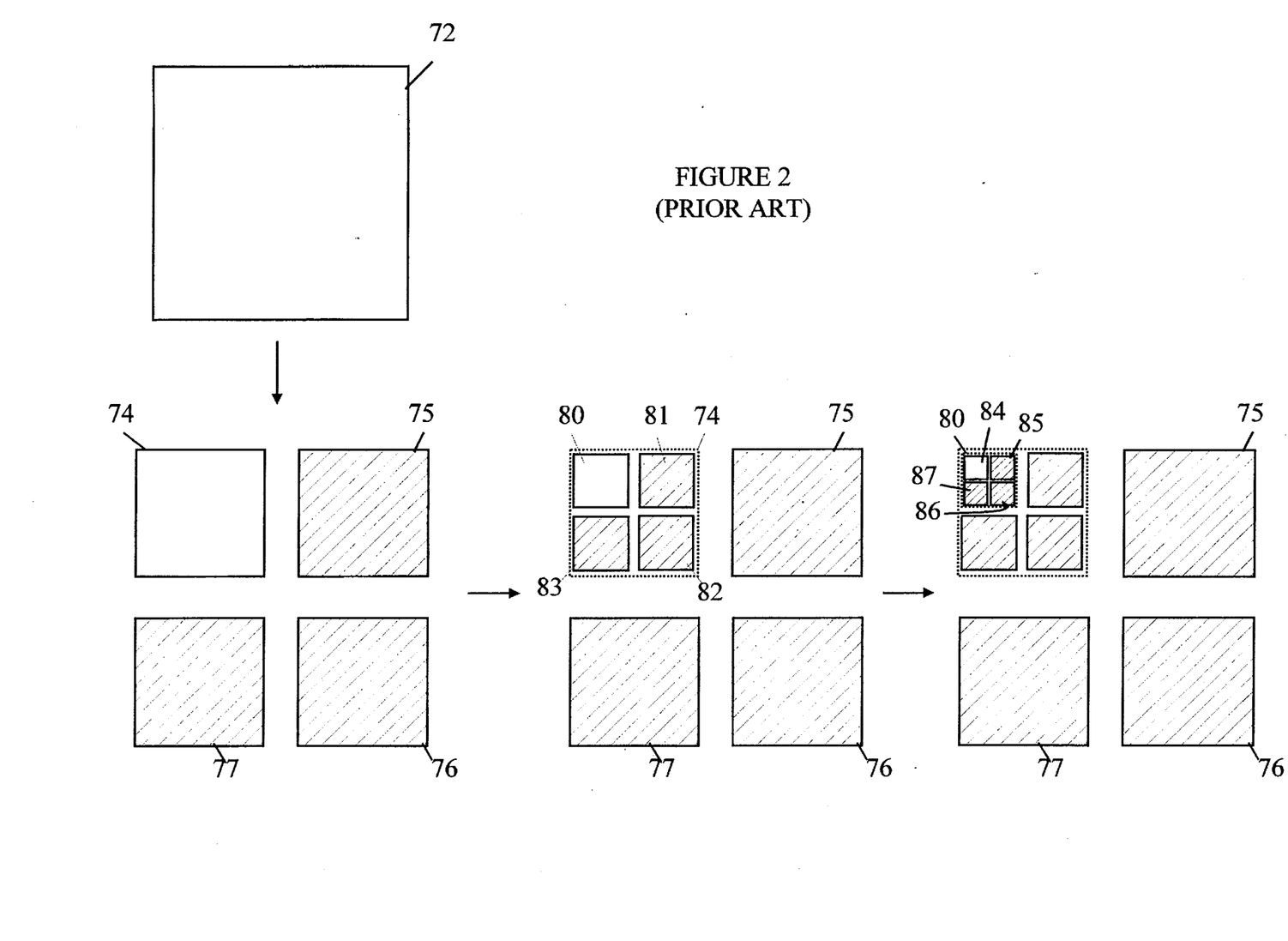
FIG. 2 illustrates the manner in which the apparatus shown in FIG. 1 may be iteratively applied to further compress the image.

Four to one image compression is, in general, too small to be useful. Hence, in the method taught by Adelson, et al., the decomposition process is iterated using the LL array from the previous decomposition as the new "image array". This is illustrated in FIG. 2. It will be assumed that the original image 72 has P×P pixels. Image 72 is decomposed into four component images, 74–77, as described above, component image 74 being the LL image. Each of the component images 74–77 are (P/2)×(P×2) pixels.

Next, component image 74 is decomposed into its four component images 80–83, component image 80 being the LL component image. Component images 80–83 each have (P/4)×(P/4) pixels. The iteration continues by decomposing the LL component into its component images at each stage. Hence, at the next stage, component image 80 will be decomposed into component images 84–87. The iteration may be continued until the LL component image is a 1×1 image, i.e., a single pixel. However, the process is normally terminated much sooner, since highly compressed images utilizing this technique are found to be subjectively unsatisfactory.

Once the image has been decomposed, the various sub-arrays are examined to identify those containing a significant amount of information. Some sub-set of these are quantized for storage and/or transmission when the method is utilized in an image compression system.

It can be shown that the numbers in the LL, LH, HL, and HH arrays obtained in the above decomposition are the coefficients of a linear expansion of the image in a set of two-dimensional basis functions. That is, the image I(x,y) having measured values $I_{i,j}$ can be written in the form $$I(x,y) = \sum_{i,j} I_{i,j} \, {}^0F_{i,j}(x,y) \quad (6)$$

$$= \sum_{i,j} {}^1LL_{i,j} \, {}^1F_{i,j}(x,y) + \sum_{i,j} {}^1LH_{i,j} \, {}^1G_{i,j}(x,y) +$$

$$\sum_{i,j} {}^1HL_{i,j} \, {}^1H_{i,j}(x,y) + \sum_{i,j} {}^1LH_{i,j} \, {}^1K_{i,j}(x,y)$$

Here, functions ${}^0F_{i,j}(x,y)$, ${}^1F_{i,j}(x,y)$, ${}^1G_{i,j}(x,y)$, ${}^1H_{i,j}(x,y)$, and ${}^1K_{i,j}(x,y)$ are the basis functions for the expansion. The superscripts denote the level of the decomposition with the original image being the 0th level. In the case of the repeated use of a QMF filter, it can be shown that the basis functions in question are not orthogonal to one another. As noted above, if orthonormal basis functions are used the expansion coefficients will have a smaller variance than if non-orthogonal basis functions are used in the expansion. A decomposition of the type described utilizing a QMF filter can be shown to produce a non-orthogonal transformation. Hence, the method taught by Adelson, et al. is less than optimal.

However, even if a CQF filter were used in place of the QMF filter taught by Adelson, et al., the above decomposition procedure would still produce less than the optimal set of coefficients from an image compression stand point. To understand the problem encountered here, one must first understand the decomposition utilized in the present invention.

Figure 3:
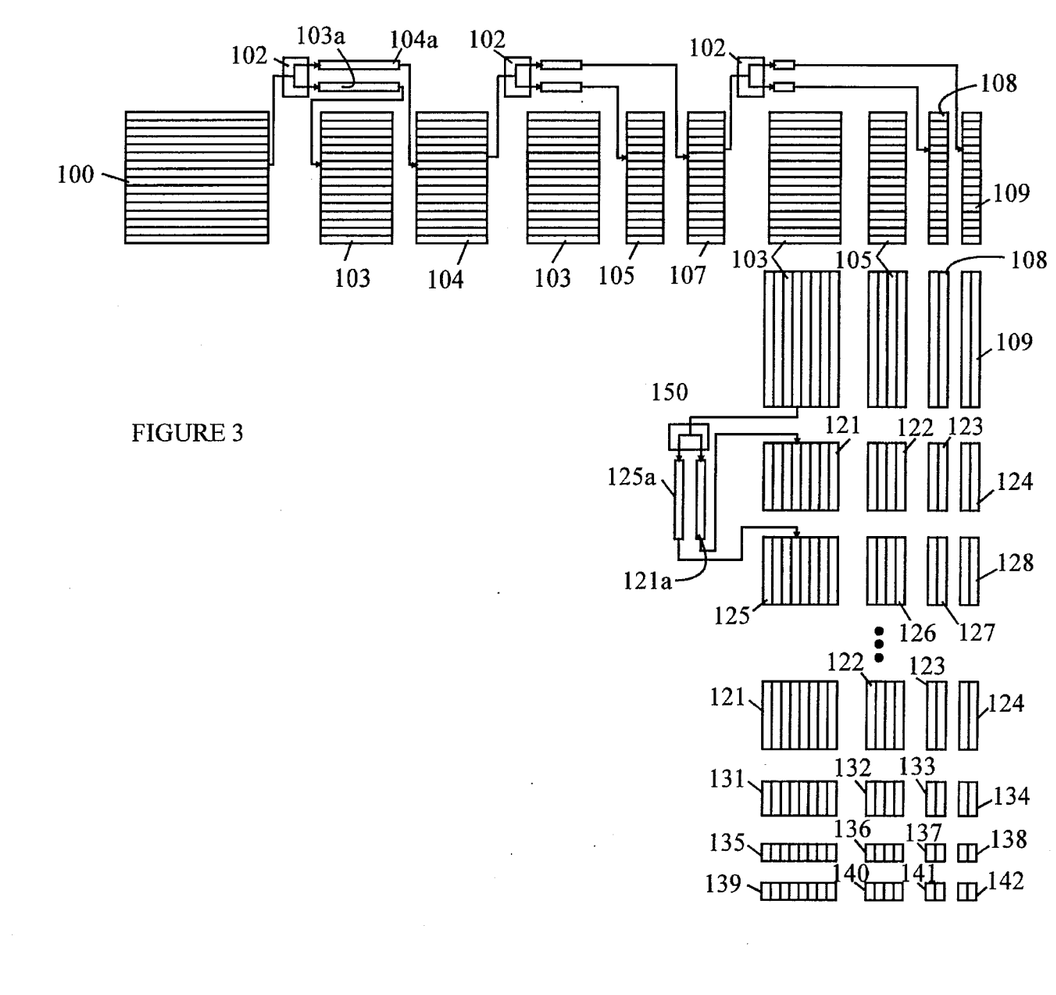
FIG. 3 is a block diagram of an image compression apparatus according to the present invention.

The decomposition scheme utilized in the present invention is illustrated in FIG. 3. The procedure starts with an array 100 of values representing the measured intensity values. Each element of this array is identified by a row and column label. However, it will be apparent to those skilled in the art that the procedure is also applicable to other arrays of values. In this example, array 100 is first decomposed into 4 arrays 103, 105, 108, and 109 having the same number of rows as array 100. These arrays will be referred to as row sub-arrays for reasons that will become clear from the following discussion. This decomposition is accomplished utilizing an analyzer 102 which is analogous to analyzer 44 shown in FIG. 1. This decomposition is accomplished in a plurality of steps. In the first step, arrays 103 and 104 are generated from array 100 by generating high and low frequency components, 103a and 104a, respectively, for each row in array 100. The low frequency components 104a obtained by decomposing the $i^{th}$ row of array 100 are stored in $i^{th}$ row of array 104. The high frequency components 103a obtained by decomposing the $i^{th}$ row of array 100 are stored in the $i^{th}$ row of array 104.

The procedure is iterated on the array in which the low frequency components from the previous decomposition are stored. Hence, arrays 105 and 107 are generated by decomposing each row of array 104 and arrays 108 and 109 are generated by decomposing array 107. The process is terminated when the length of the low frequency component so produced decreases to some predetermined value. In the exemplary apparatus shown in FIG. 3, the process is terminated after four sub-arrays have been produced.

At this point, each column in each of the arrays generated by the row decomposition of array 100 is decomposed thereby generating a plurality of arrays from each said array. The decomposition is accomplished by decomposing each column of an array generated in a previous decomposition into high and low components utilizing an analyzer 150 which is performs the same operations as analyzer 102. The only difference between analyzers 102 and 150 lies in whether the analyzer operates on row or column data. Again, the array which is decomposed is that containing the lowest frequency row components from the previous decomposition.

At the start of the column decomposition illustrated in FIG. 3, each column of array 103 is analyzed to generate a low frequency column component 125a and a high frequency column component 121a. The low frequency component 125a generated by decomposing the $i^{th}$ column of array 103 is stored in the $i^{th}$ column of array 125. The high frequency component 121a generated by decomposing the $i^{th}$ column of array 103 is stored in the $i^{th}$ column of array 121. When all of the columns of array 103 have been so decomposed, the process is repeated on array 105, and so on.

The iteration is continued until the number of elements in the low frequency column components so generated has decreased some predetermined value. In the example shown in FIG. 3, the process was terminated when after array 100 had been decomposed into the 16 sub-arrays shown at 121–124 and 131–141.

The elements of each sub-array represent image information having different spatial content in the directions corresponding to the rows and columns in array 100. The lowest frequency information is contained in array 142. The highest frequency information is contained in array 121. The statistical properties of the elements of the various sub-arrays may be examined to determine which sub-arrays contain useful information about the image. For example, the some of the squares of elements in each sub-array is a measure of the "amount" of information contained in said sub-array. Those sub-arrays which include useful information can then be quantized to an accuracy consistent with their information content by examining the variance of the elements in the sub-arrays in question.

Figure 4:
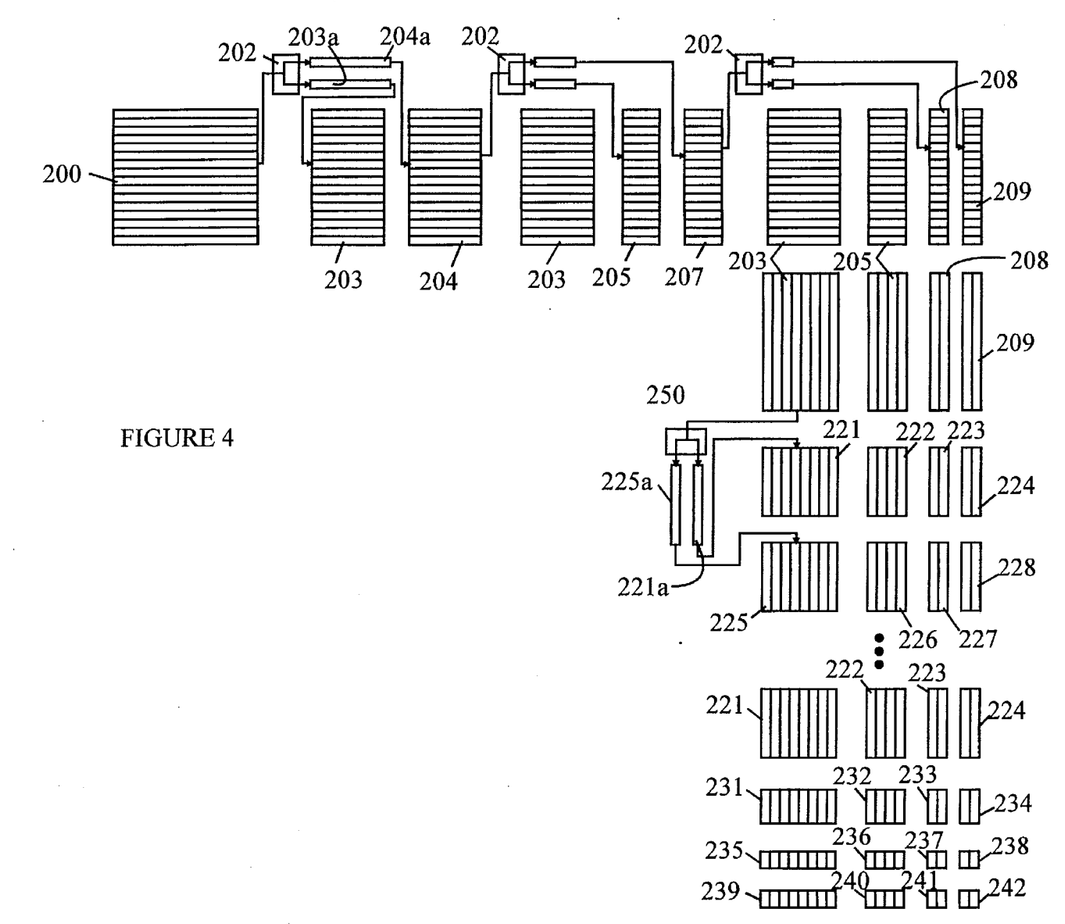
FIG. 4 is a block diagram of an apparatus according to the present invention for generating an image from a compressed image.

The decomposition according to the present invention shown in FIG. 3 can be reversed to produce an image array 200 from a plurality of decomposition arrays 221–224 and 231–241 as shown in FIG. 4. In this figure, elements which serve analogous functions to those shown in FIG. 3 are given numbers differing from those elements by 100. In general, the decomposition arrays are approximations to the arrays that would be obtained if image 200 had been decomposed in the manner shown in FIG. 3. The synthesis of array 200 from the decomposed arrays proceeds in a manner analogous to the decomposition except that each of the analyzers 150 is replaced by a synthesizer 250 which combines the high and low frequency components of a column to produce a column having twice the number of elements as contained in each input column. Similarly, the row analyzers 102 are replaced by row synthesizers. The synthesizers operate according to Eq. (2) above.

It should be noted that the various sub-images can be stored in the same space used to store the original image if storage is provided for said image. The various decompositions only alter one row or column at a time.

It should be noted that the present invention requires significantly fewer computations than the scheme taught by Adelson, et al. in the case in which only the low frequency coefficients are to be saved. Referring again to FIG. 3, assume that only the low frequency coefficients are to be saved. These correspond to the coefficients in sub-array 142. These coefficients depend only on the coefficients in sub-array 109. Hence, the column transformation need only be performed on sub-array 109 and the sub-arrays derived therefrom. In the method taught by Adelson, et al., all of the sub-arrays must be calculated, even if the final low frequency sub-array is the only to be saved.

It will also be apparent to those skilled in the art from the above description of the present invention that the amount of storage needed to decompose an image according to the present invention may be as small as that needed to store one row of the image and and the sub-array containing the $y_L$ components of the decomposition of the rows of the image. Referring again to FIG. 3, if only the final low frequency sub-array 142 is to be saved, then only sub-array 109 needs to be formed. The image may be processed one row at a time to form the final $y_L$ component corresponding to the row in question. The space needed to store the components generated in addition to this component can be stored in the same memory as that used to store the row data. The final $y_L$ component for a given row is then stored in the corresponding row of the row sub-array corresponding to this component.

After all rows of the image have been processed, the row sub-array is decomposed one column at a time. Since the space needed to store the coefficients obtained from one row is the same as that needed to store the row, the resulting coefficients can be stored in place of the column data used to generate them. Thus no new storage is needed.

A second advantage of the present invention over that taught by Adelson, et al. lies in the number of sub-arrays that must be quantized to accurately represent images having large numbers of vertical and horizontal edges. Such images are quite common. In the scheme taught by Adelson, et al., all sub-arrays which include a "L" designation must be saved. This amounts to about ⅔ of the sub-array data.

If the method of the present invention is utilized, only those sub-arrays that contain components of the $y_L$ output of the last application of the analyzer transformation need be saved. This corresponds to arrays 224, 234, 238, and 239–242. In the examples shown in FIGS. 3 and 4, the number of elements in these arrays is only ⅛th of the total. Hence, the present invention is capable of significantly better compression when dealing with such images.

There a large number of sets of a(i) that satisfy the above conditions. In the preferred embodiment of the present invention, the parameters a(k) further satisfy the condition:

$$\sum_{i=0}^{N-1} a(N-i-1)(-1)^i i^Q = 0 \quad (7)$$

where Q is any non-negative integer which is less than or equal to (N/2)–1. The improvement obtained with this definition is related to the fact that the expansion coefficients of the high frequency basis functions are zero if x is a polynomial of degree less than N/2.

This choice of a(k) is useful in representing images since the structures in images tend to vary in a smooth manner which can be represented by a polynomial in two dimensions. Hence, the basis functions used in the equivalent expansion of the image will more accurately represent the properties of the image. In this case, more of the information will be contained in the low frequency components of the image expansion, thereby allowing high image compression ratios.

As noted above, transformations having small support are advantageous in that they tend to produce noise-like errors instead of alias-like errors in the reconstructed images. The support of the transformation is related to the number of a(i). In the preferred embodiment of the present invention, the number of coefficients is less than 20.

While the above description of the present invention has been made in terms of image compression, it will be apparent to those skilled in the art that the present invention can be used for generating a representation of any two-dimensional array of values.

There has been described herein a novel image method and apparatus for compressing images or like arrays. Various modifications to the present invention will become apparent to those skilled in the art from the foregoing description and accompanying drawings. Accordingly, the present invention is to be limited solely by the scope of the following claims.

What is claimed is:

1. An apparatus for reconstructing an image comprising a two-dimensional array of pixel values organized as a plurality of rows and columns from a plurality of component images, each said component image being organized as a plurality of rows and columns, said apparatus comprising:

means for receiving information specifying said component images and for generating the rows and columns of said component images from said received information, said component images being stored in a memory in said apparatus as a plurality of component arrays each said component array being organized as a plurality of rows and columns;

linear synthesizing means connected to said memory for combining first and second linear arrays of values representing the high and low frequency components of a third linear array of values to generate said third linear array;

column processing means connected to said linear synthesizing means for causing said linear synthesizing means to iteratively process the columns of said component arrays, said first iteration combining pairs of columns in selected said component arrays to form a column of a column array and successive said iterations combining one column from a column array with one column from a component array to generate a column of a new column array, said column arrays being stored in said memory, said iteration terminating when all columns in said component arrays have been processed; and row processing means connected to said linear synthesizing means for causing said linear synthesizing means to iteratively process each pair of corresponding rows in said column arrays, to generate a row of a sub-array, said first iteration combining pairs of rows in selected said column arrays to form a row of a sub-array and successive said iterations combining one row from a sub-array array with one row from a component array to generate a row of a new sub-array said sub-arrays being stored in said memory, said iteration terminating when all rows in said column arrays have been processed.

2. The apparatus of claim 1 wherein said linear synthesizing means comprises means for generating a linear array z(i) from two linear arrays $x_L(i)$ and $x_H(i)$ each having M/2 components wherein $$z(2m) = \sum_{k=0}^{N/2-1} a(2k)x_L[m-k+(N/2)] + \sum_{k=0}^{N/2-1} a(2k+1)x_H(m+k)$$

$$z(2m+1) = \sum_{k=0}^{N/2-1} a(2k+1)x_L[m+(N/2)-k] - \sum_{k=0}^{N/2-1} a(2k)x_H(m+k)$$

m running from 1 to M/2 and wherein the a(k) satisfy the conditions $$\sum_{i=0}^{N-1} a^2(i) = 2$$

wherein a(k)=0 for k<0 or k>(N−1) and N is an even number greater than 4 and less than 20, and $$\sum_{i=0}^{N-1} a(i) = 2.$$

3. The apparatus of claim 2 wherein said a(i) further satisfy the condition $$\sum_{i=0}^{N-1} a(N-i-1)(-1)^i i^Q = 0$$

wherein where Q is any non-negative integer which less than or equal to (N/2)−2.

* * * * *